US00RE40680E

(19) United States
(12) Reissued Patent
Suggs

(10) Patent Number: US RE40,680 E
(45) Date of Reissued Patent: Mar. 24, 2009

(54) MULTI-RESOLUTION COLOR CONTACT-TYPE IMAGE SENSING APPARATUS

(75) Inventor: Bradley Suggs, Sunnyvale, CA (US)

(73) Assignee: Hewlett-Packard Development Company, L.P., Houston, TX (US)

(21) Appl. No.: 09/996,967

(22) Filed: Nov. 27, 2001

Related U.S. Patent Documents

Reissue of:
(64) Patent No.: 6,009,214
Issued: Dec. 28, 1999
Appl. No.: 08/959,062
Filed: Oct. 28, 1997

(51) Int. Cl.
*G06K 7/00* (2006.01)
*H04N 1/46* (2006.01)
*H04N 3/14* (2006.01)

(52) U.S. Cl. ..... 382/312; 358/505; 348/302
(58) Field of Classification Search ..... 382/312; 235/494; 378/15; 347/237; 399/165, 216; 348/302; 358/302, 505, 406, 513
See application file for complete search history.

(56) References Cited

U.S. PATENT DOCUMENTS

| | | | | | |
|---|---|---|---|---|---|
| 4,204,230 | A | * | 5/1980 | Sprague | 358/213 |
| 4,288,821 | A | | 9/1981 | Lavallee et al. | 358/3.07 |
| 4,725,889 | A | * | 2/1988 | Yaniv et al. | 358/285 |
| 4,782,399 | A | * | 11/1988 | Sato | 358/280 |
| 4,853,785 | A | * | 8/1989 | Ovshinsky et al. | 358/213.11 |
| 5,264,939 | A | * | 11/1993 | Chang | 358/213.22 |
| 5,345,319 | A | | 9/1994 | Yu | 358/483 |
| 5,751,032 | A | | 5/1998 | Yu | 257/233 |
| 5,969,830 | A | | 10/1999 | Kimura | 358/483 |
| 6,034,366 | A | | 3/2000 | Yu | 250/208.1 |
| 6,040,202 | A | | 3/2000 | Yu | 438/70 |

FOREIGN PATENT DOCUMENTS

| | | | | |
|---|---|---|---|---|
| JP | 406130871 | A | * | 5/1994 |
| JP | 407104538 | A | * | 4/1995 |

* cited by examiner

*Primary Examiner*—Anh Hong Do

(57) ABSTRACT

A multi-resolution color contact-type image sensing apparatus whereby a color image of an original can be obtained with a particular resolution, depending upon the size of the original image. A first array of photosensor segments with a base resolution is arranged with at least one other array of photosensor segments having a greater-than-base resolution. All such photosensor segments might *be* aligned in a single linear array, with at least one portion of segments having a greater-than-base resolution. A resulting image with at least the base resolution could be created depending upon the size of the original in relation to the placement and width of the greater-than-base resolution segments. A plurality of linear arrays might also be used, with each successive array having a greater resolution than the previous array. Moreover, the arrays might be arranged in parallel with each successive array being narrower in width than the previous. Each linear array could be operated independently or in conjunction with the other linear arrays to produce multi-resolution resulting images. The resolution could be manually or automatically selected.

54 Claims, 3 Drawing Sheets

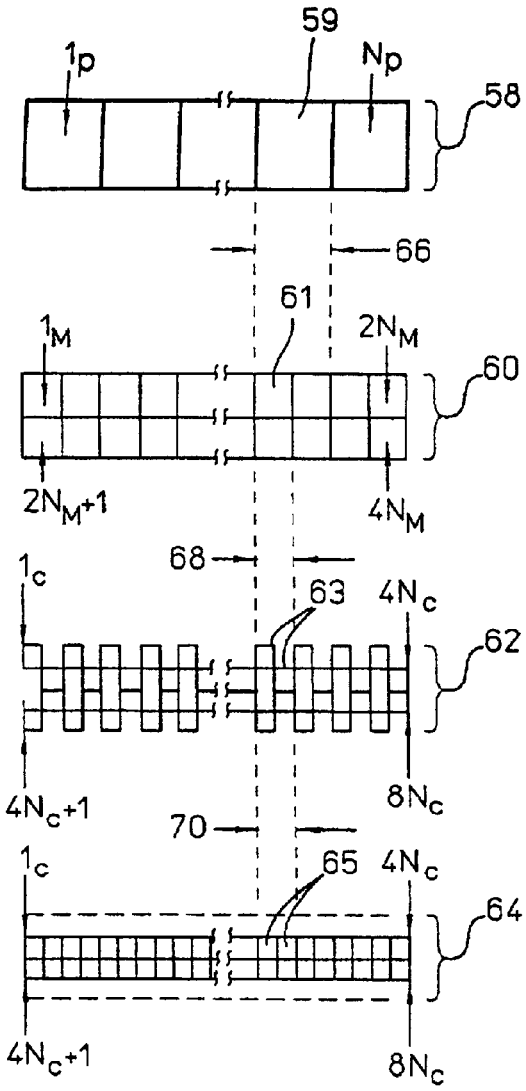
Figure 3a
Figure 3b
Figure 3c
Figure 3d
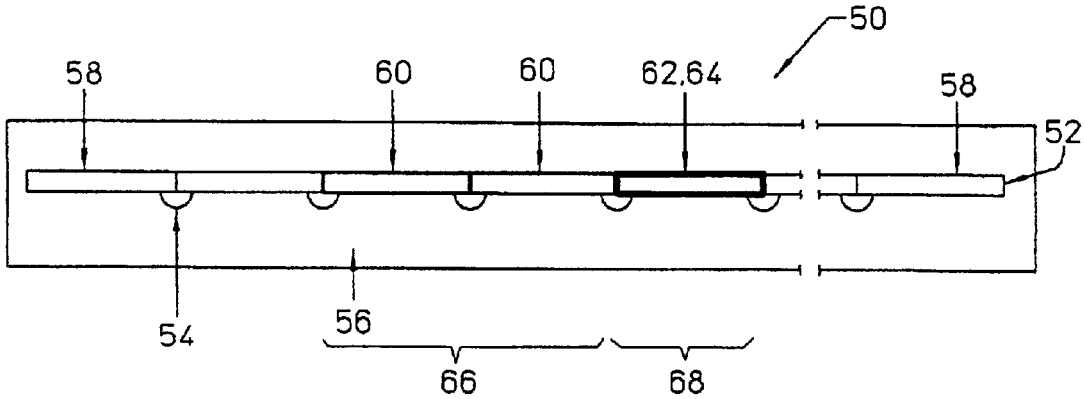
Figure 3e

MULTI-RESOLUTION COLOR CONTACT-TYPE IMAGE SENSING APPARATUS

Matter enclosed in heavy brackets [ ] appears in the original patent but forms no part of this reissue specification; matter printed in italics indicates the additions made by reissue.

FIELD OF INVENTION

This invention relates to a multi-resolution color contact-type image sensing apparatus which uses arranged segments of varying pixel density along an array of photosensors. A color image of an original is thereby obtained with a particular resolution from a certain sized original which is exposed to the full array. A higher resolution image is obtained from a smaller sized original which is exposed to a portion of the array having segments with higher densities.

BACKGROUND OF THE INVENTION

Current color contact-type image sensor devices employ segments of linearly arrayed photosensors produced in silicon and wire bonded as a chip-on-board construction. Each segment is similar or identical in pixel element density. The segments are arranged to span the maximum width of the original image to be scanned. Color images are produced by time-multiplexing illumination produced from at least three different types or colors of LEDs (i.e. red, green, and blue). A self-focusing lens system is arranged to focus the illuminated image on the photosensor pixel elements as the image is mechanically moved across the length of the linear photosensor array.

In order to produce multiple resolution images from the same array, optical elements are required to provide different magnifications of the image onto the photosensor elements. To produce a higher resolution resulting image, an original image of fixed sized must be magnified and focused across a large number of photosensor elements. Hence, the sensing element ratio must approximately scale with the inverse size ratio of the original image. This multi-resolution sensor and lens configuration is relatively costly to manufacture.

What is needed is an image sensing apparatus which provides multi-resolution color capabilities, but without requiring a complicated lens configuration for magnification. The apparatus should be capable of producing high resolution resulting images from original images which are smaller in size than the full width of the photosensor array. The system should be a relatively compact and economical device to manufacture and use.

SUMMARY OF THE INVENTION

The invention described herein comprises the geometric layout and use of a sensor array constructed to be able to yield multiple resolution resulting images from different sized original images. Prior sensor arrays have been comprised of a linear array of photosensor segments, with each segment having a similar pixel density. A dual-resolution embodiment of the present invention includes central segments which have a higher density of photosensitive pixel elements than the peripheral segments. A triple-resolution embodiment includes a third set of middle photosensor segments which have a higher pixel density than the central segments. These segments of varying pixel density can be aligned in a linear arrangement or staggered in a step-wise arrangement. A standard resolution resulting image can be produced from an original which spans the entire width of the photosensor segments. A higher resolution resulting image can be produced from an original which has been sized to pass over the appropriate middle or central segments, depending upon the resolution desired.

One advantage of the disclosed invention is that the photosensor array is relatively inexpensive and easy to manufacture. The resulting device is also relatively compact and can be used in color contact-type image sensing applications (i.e. a one-to-one ratio between photosensor elements and the scanned image). Other advantages of this invention will become apparent from the following description taken in conjunction with the accompanying drawings which set forth, by way of illustration and example, certain embodiments of this invention. The drawings constitute a part of this specification and include exemplary embodiments, objects and features of the present invention.

BRIEF DESCRIPTION OF THE DRAWINGS

FIG. 3(a) shows a peripheral photosensor array segment from the triple-resolution sensor board of FIG. 3(e).

FIG. 3(b) shows a middle photosensor array segment from the triple-resolution sensor board of FIG. 3(e).

FIG. 3(c) shows a central photosensor array segment from the triple-resolution sensor board of FIG. 3(e).

FIG. 3(d) shows an alternative central photosensor array segment from the triple-resolution sensor board of FIG. 3(e).

FIG. 3(e) shows an example triple-resolution color contact-type image sensor board.

DETAILED DESCRIPTION OF THE PREFERRED EMBODIMENT

Figure 1A:
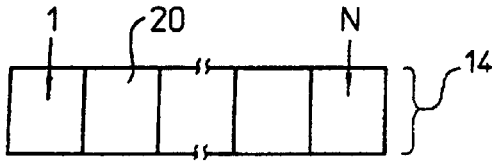
Figure 1a (PRIOR ART)
FIG. 1(a) shows a photosensor array segment from the sensor board shown in FIG. 1(b).
Figure 1B:
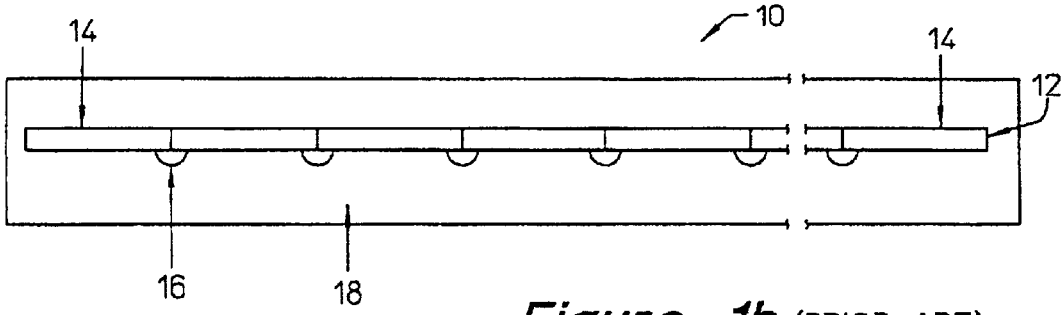
Figure 1b (PRIOR ART)
FIG. 1(b) shows a prior art color contact-type image sensor board.

FIGS. 1(a)–1(b) collectively show a simplified view of a prior art photosensor board 10 as used in color contact-type image sensors. The photosensor array 12 typically consists of a collection of linearly aligned photosensor segments 14 produced in silicon and bonded, via wire bonds 16 and the like, to the printed circuit board 18 as a chip-on-board construction. In this instance, each segment 14 is identically formed and includes a certain number N of pixels 20, which are shown numbered 1 to N. Accordingly, in order for smaller sized originals to be scanned at a higher resolution, the image must be magnified via a lens arrangement (not shown) to cover more pixels. Such lens arrangements are relatively expensive to produce.

Figure 2A:
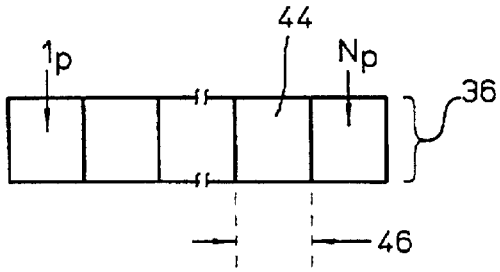
FIG. 2(a) shows a peripheral photosensor array segment from the dual-resolution sensor board of FIG. 2(c).
Figure 2B:
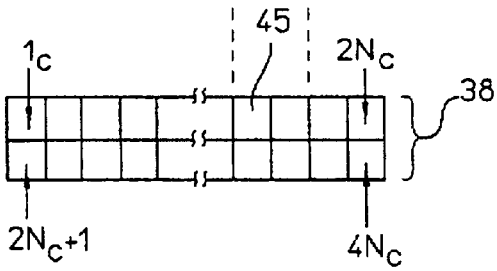
FIG. 2(b) shows a central photosensor array segment from the dual-resolution sensor board of FIG. 2(c).
Figure 2C:
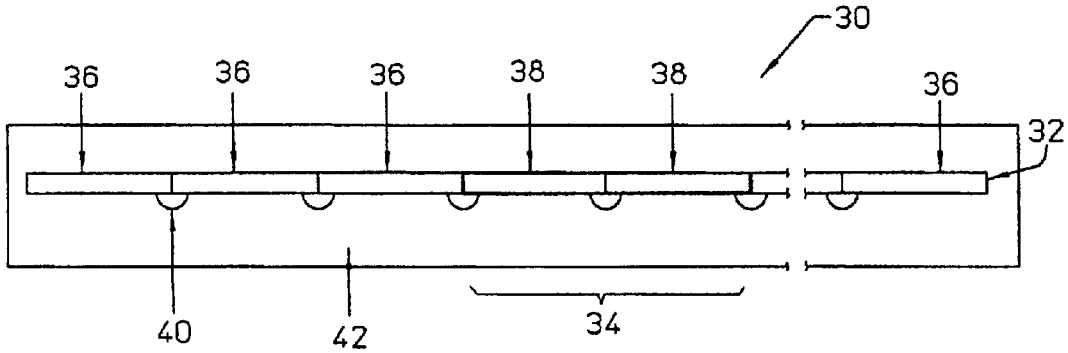
FIG. 2(c) shows an example dual-resolution color contact-type image sensor board.

FIGS. 2(a)–2(c) collectively show a simplified view of the geometry of an embodiment of the present invention. A dual-resolution photosensor array 30 is shown in FIG. 2(c) comprised of linearly aligned photosensor segments 32. As before, the photosensor segments might be produced in silicon and bonded, via wire bonds 40 and the like, to the printed circuit board 42 as a chip-on-board construction. In this example embodiment, a central portion 34 of the photosensor segments 32 have a relatively higher pixel density. The peripheral segments 36, shown enlarged in FIG. 2(a), are comprised of a certain number N of pixels, shown numbered as $1_P$ to $N_P$. The central segments 38 are shown enlarged in FIG. 2(b). Each peripheral pixel 44 corresponds in width with a two-by-two (2×2) grouping or arrangement of central pixels 45, as depicted by the arrows 46. Each central segment 38 thereby has central pixels 45 which are four times (4×) as numerous as the peripheral pixels 44, and shown numbered as $1_c$ to $2N_c$ across the top row, and $2N_c+1$ to $4\ N_c$ across the bottom row. This 4× density of the central segments 38, as compared to the peripheral segments 36, is shown for example purposes only and any density might be used within the scope of the invention.

With the shown sensor geometry, the entire width of an original image can be scanned across the photosensor array 32 at one base resolution, or a smaller sized original image can be scanned across the central portion 34 to produce a higher density resulting image. The mechanical movement used between the sensor and the original image could have the same step size for either resolution used. In order to compensate for the smaller pixel area available in the central portion 34, a variety of solutions exist including, but not limited to: additional amplification of the signal produced by the central segments; increasing the light integration time; increasing the illumination level; or some combination thereof. It is also preferable, in order to provide a more economical device, to utilize the same circuitry to receive the electrical signals representative of the image data for processing either resolution image. A control signal would be provided, either manually or automatically, to select whether the whole width is to be active, or just the central portion 34. When the whole width is active, the signals from the 2×2 central grouping of pixels might, for instance, be summed to yield a signal roughly equivalent to the signal produced by one peripheral pixel.

FIGS. 3(a)–3(e) collectively show a simplified view of the geometry of yet another embodiment of the present invention. A triple-resolution photosensor array 50 is shown in FIG. 3(e) comprised of three types of linearly aligned photosensor segments 52, namely peripheral 58, middle 60, and central segments 62 (or 64), with each segment type having different relative pixel densities. The photosensor segments might be produced, as described above, in silicon and bonded, via wire bonds 54 and the like, to the printed circuit board 56 as a chip-on-board construction. In this example embodiment, a middle portion 66 of the photosensor segments 52 has a relatively higher pixel density than the peripheral segments 59, and a central portion 68 of the photosensor segments 52 has a relatively higher pixel density than the middle segments 60.

A peripheral segment 58 is shown in FIG. 3(a) with a certain number N of pixels 59 numbered as $1_P$ to $N_P$. A middle segment 60 is shown in FIG. 3(b) with a relatively higher number of middle pixels 61. In this instance, a peripheral pixel 59 corresponds in width with a 2×2 grouping of middle pixels 61, as depicted by arrows 66. The middle pixels 61 are shown numbered as $1_M$ to $2N_M$ and $2N_M+1$ to $4N_M$ across the adjoining rows of pixels for this example configuration. One embodiment of a central segment 62 is shown in FIG. 3(c), wherein each middle pixel 61 corresponds in width with two staggered central pixels 63, as depicted by arrows 68. Yet another embodiment of a central segment 64 is shown in FIG. 3(d) wherein each middle pixel 61 corresponds in width with a grouping of two aligned central pixels 65, as depicted by arrows 70. In each embodiment, the staggered and aligned central pixels 63, 65 are numbered as $1_c$ to $4N_c$ and $4N_c+1$ to $8N_c$ across the upper and lower rows of pixels. These example arrangements for the central segments 62, 64 provide yet another factor of 2 increase in resolution over the middle segments 60.

With this representative sensor geometry, an original image which spans the whole width of the photosensor array 52 could be imaged at a certain base resolution, the middle portion 66 and central portion 68 together could be used to scan an image at twice (or double) the base resolution, and the central portion 68 could be used to scan an image at four times (or quadruple) the base resolution. With the geometry shown, the mechanical movement between the sensor array 52 and the original image might use the same step size for both the base resolution and the double resolution scanning processes. The step size would likely be halved for the quadruple resolution scanning process.

With three different resolutions available for processing three differently sized original input images, similar compensation solutions for the pixel area differences could be provided as previously described above for the dual-resolution embodiment. With this particular sensor example, a control signal, either manual or automatic, would select whether just the central portion 68 is to be used, or whether the middle and central portions 66 and 68 are to *be* used, or whether the whole width is to be active. When the combined middle and central regions 66, 68 are used, the signals from the two of the central pixels 63 or 65 could be summed and doubled to yield a signal roughly equivalent to that from one middle pixel 61. When the whole width is *to* be active, the signals from a 2×2 grouping of middle pixels 61 could be summed to yield a signal roughly equivalent to that coming from one peripheral pixel 59. Alternatively and as appropriate, the signals derived as stated above from a grouping of two central pixels could take the place of one middle pixel and thereby be summed to yield a signal roughly equivalent to that coming from one peripheral pixel 59.

Figure 4A:
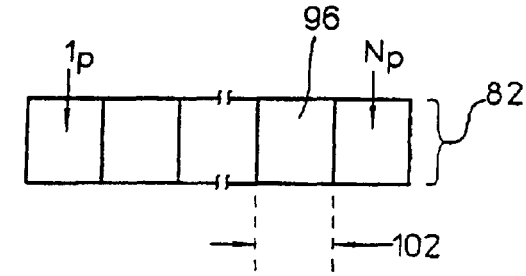
FIG. 4(a) shows a peripheral photosensor array segment from the triple-resolution sensor board of FIG. 4(d).
Figure 4B:
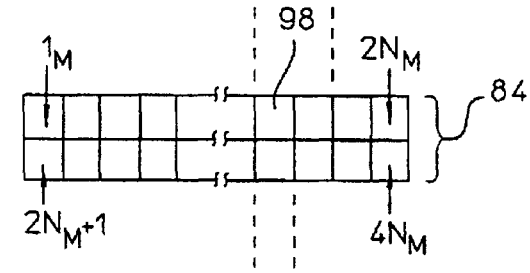
FIG. 4(b) shows a middle photosensor array segment from the triple-resolution sensor board of FIG. 4(d).
Figure 4C:
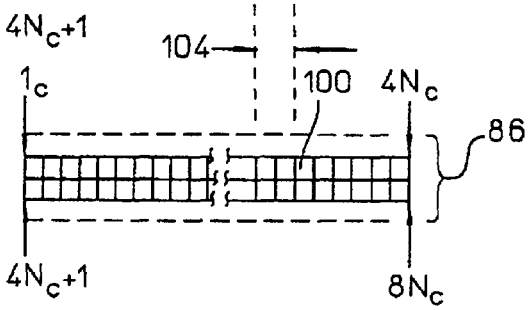
FIG. 4(c) shows a central photosensor array segment from the triple-resolution sensor board of FIG. 4(d).
Figure 4D:
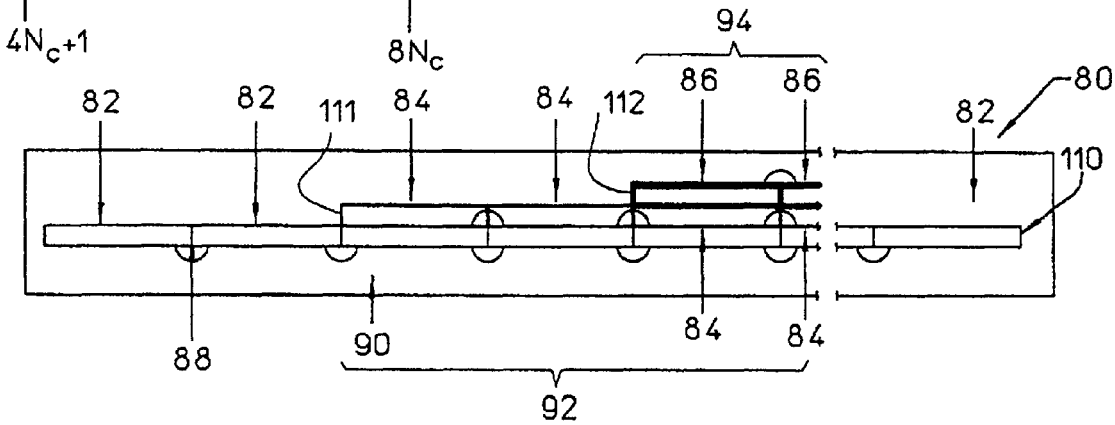
FIG. 4(d) shows yet another example of a triple-resolution color contact-type image sensor board.

FIGS. 4(a)–4(d) collectively show a simplied view of the geometry of still another embodiment of the present invention. A triple-resolution photosensor array 80 is shown in FIG. 4(d) comprised of three levels 110–112 of linearly aligned photosensor segments, respectively comprised of peripheral segments 82, middle segments 84, and central segments 86, with each segment type having different relative pixel densities. The photosensor segments might be produced, as described above, in silicon and bonded, via wire bonds 88 and the like, to the printed circuit board 90 as a chip-on-board construction. In this example embodiment, the middle portion 92 of the photosensor segments 84 have a relatively higher pixel density than the peripheral segments 82, and the central portion 94 of the photosensor segments 86 have a relatively higher pixel density than the middle segments 84.

As similar to FIG. 3, a peripherial segment 82 is shown in FIG. 4(a) with a certain number N of pixels 96 numbered as $1_P$ to $N_P$. A middle segment 84 is shown in FIG. 4(b) with a relatively higher number of middle pixels 98. In this instance, a peripherial pixel 96 corresponds in width with a grouping of 2×2 middle pixels 98, as depicted by arrows 102. The middle pixels 98 are shown numbered as $1_M$ to $2N_M$ and $2N_M+1$ to $4N_M$ across the adjoining rows of pixels for this example configuration. This embodiment shows a central segment 86 in FIG. 4 (c), wherein each middle pixel 98 corresponds in width with a grouping of two aligned central pixels 100, as depicted by arrows 104. The aligned central pixels 100 are numbered as $1_c$ to $4N_c$ and $4N_c+1$ to $8N_c$ across the upper and lower rows of pixels. This arrangement of the central segments 86 provides a factor of 2 increase in resolution over the middle segments 84.

In this embodiment, similar processes to those described above could also be used to compensate the different signal levels for the various pixel densities. In this sensor layout, the three stacked linear arrays 110–112 might be used separately from each other, or simultaneously, to produce a resulting image. One benefit of using the arrays separately would include a relative minimization, as compared to the prior embodiments, of analog sensor arithmetic operations. When used simultaneously, the increased pixel area would improve the resulting image quality, but at the tradeoff expense of an increased data rate which would require more memory and processing capabilities.

The disclosed embodiments show certain ratios of pixel area and density as used in segments described as peripherial, middle, and/or central segments. While these descriptions were meant to illustrate the invention, such embodiments are not meant *to* limit the relative placement of these various segments to those shown. It may be desirable, for example, to move the "central" region to one end of the sensor array. In addition, the differention between regions of different pixel area and density were illustrated as belonging to different segments. This may be desirable, but is not intended to be a limiting feature. Moreover, the choice of which region(s) are to be used could be determined by an automatic correlation with the width of the original image. Alternatively, a manual selection process might be used.

More generally, it is to be understood that while certain forms of the invention are illustrated, they are not to be limited to the specific forms or arrangements of parts herein described and shown. It will be apparent to those skilled in the art that various changes may be made without departing from the scope of the invention and the invention is not to be considered limited to what is shown in the drawings and descriptions.

What is claimed is:

1. A multiple resolution sensing apparatus, comprising:

a first photosensor segment having a first plurality of photosensitive elements; and, a second photosensor segment, adjacent to the first photosensor segment, the second photosensor segment having a second plurality of photosensitive elements, wherein density of photosensitive elements within the second photosensor segment is greater than density of photosensitive elements in the first photosensor segment;

wherein when scanning at a first resolution, both the first photosensor segment and the second photosensor segment are used;

wherein when scanning at a second resolution, the second photosensor segment is used and the first photosensor segment is not used; wherein the second resolution is greater than the first resolution; and wherein a maximum image size for a scanned image is smaller when scanning at the second resolution than when scanning at the first resolution.

2. A multiple resolution sensing apparatus as in claim 1 additionally comprising:

a third photosensor segment, adjacent to the second photosensor segment, the third photosensor segment having a third plurality of photosensitive elements, wherein density of photosensitive elements within the third photosensor segment is greater than density of photosensitive elements in the second photosensor segment;

wherein when scanning at the first resolution and at the second resolution, the third photosensor segment is also used;

wherein when scanning at a third resolution, the third photosensor segment is used while the first photosensor segment and the second photosensor segment are not used;

wherein the third resolution is greater than the second resolution; and wherein a maximum image size for a scanned image is smaller when scanning at the third resolution than when scanning at the second resolution.

3. A multiple resolution sensing apparatus as in claim 1, wherein the first photosensor segment and the second photosensor segment are arranged in a linear array.

4. A multiple resolution sensing apparatus as in claim 3, wherein the linear array has a central region and peripheral regions, the second photosensor segment is in the central region and the first photosensor segment is in one of the peripheral regions.

5. A multiple resolution sensing apparatus as in claim 1:

wherein photosensitive elements in the first photosensor segment have a larger element size than photosensitive elements in the second photosensor segment; and wherein the photosensitive elements produce electrical signals corresponding to the element size;

the multiple resolution sensing apparatus additionally comprising a compensation means for processing the electrical signals.

6. A multiple resolution sensing apparatus as in claim 5, wherein the compensation means substantially equalizes the electrical signals produced by different groupings of photosensitive elements.

7. A multiple resolution sensing apparatus as in claim 1, wherein resulting image resolution is manually selectable.

8. A multiple resolution sensing apparatus as in claim 1, wherein resulting image resolution is automatically selected based upon an original image.

9. A multiple resolution sensing apparatus as in claim 1, additionally comprising:

a third photosensor segment, adjacent to the first photosensor segment opposite the second photosensor segment, having a third plurality of photosensitive elements, wherein density of photosensitive elements within the third photosensor segment is equal to density of photosensitive elements in the first photosensor segment;

wherein when scanning at the first resolution, the third photosensor segment is also used; and wherein when scanning at the second resolution, the third photosensor segment is not used.

10. A method for scanning at multiple resolutions, the method comprising the following steps:

(a) when scanning at a first resolution, performing the following substeps:

(a.1) scanning a first portion of an original image using a first plurality of photosensitive elements within a first photosensor segment, and (a.2) scanning a second portion of the original image using a second plurality of photosensitive elements within a second photosensor segment, wherein the second photosensor segment is adjacent to the first photosensor segment and density of photosensitive elements within the second photosensor segment is greater than density of photosensitive elements in the first photosensor segment; and, (b) when scanning at a second resolution, scanning using the second plurality of photosensitive elements within the second photosensor segment but not using the first plurality of photosensitive elements within the first photosensor segment, wherein the second resolution is greater than the first resolution.

11. A method as in claim 10 wherein a maximum image size is smaller when scanning at the second resolution than when scanning at the first resolution.

12. A method as in claim 10 additionally comprising the following step:

(c) when scanning at a third resolution, scanning using a third plurality of photosensitive elements within a third photosensor segment but not using the first plurality of photosensitive elements within the first photosensor segment or the second plurality of photosensitive elements within the second photosensor segment, wherein the third resolution is greater than the second resolution.

13. A method as in claim 12, wherein step (a) additionally comprises the following substep:

(a.3) scanning a third portion of the original image using the third plurality of photosensitive elements within the photosensor segment, wherein the third photosensor segment is adjacent to the second photosensor segment and density of photosensitive elements within the third photosensor segment is greater than density of photosensitive elements in the second photosensor segment.

14. A method as in claim 10, wherein the first photosensor segment and the second photosensor segment are arranged in a linear array.

15. A method as in claim 14, wherein the linear array has a central region and peripheral regions, the second photosensor segment is in the central region and the first photosensor segment is in one of the peripheral regions.

16. A method as in claim 10 wherein in step (a) photosensitive elements in the first photosensor segment have a larger element size than photosensitive elements in the second photosensor segment, the photosensitive elements producing electrical signals corresponding to the element size.

17. A method as in claim 16, wherein step (a) additionally comprises the following substep:

(a.3) substantially equalizing electrical signals produced by different groupings of photosensitive elements.

18. A method as in claim 10, additionally comprising the following step:

manually selecting resulting image resolution.

19. A method as in claim 10, additionally comprising the following step:

automatically selecting image resolution based upon an original image.

20. A method for scanning at multiple resolutions, the method comprising the following steps:

(a) automatically selecting resulting image resolution based on an original image, including the following substeps:

(a.1) when an original image has a width within a first predetermined range, selecting a first resolution, and (a.2) when the original image has a width within a second predetermined range, selecting a second resolution;

(b) when in step (a) the first resolution is selected, scanning the original image at the first resolution; and, (c) when in step (a) the [first] *second* resolution is selected, scanning the original image at the [first] *second* resolution.

*21. A multiple resolution sensing apparatus as in claim 3, further comprising:*

*a plurality of first photosensor segments coupled together to form a first portion of the linear array and having a first length; and*

*a plurality of second photosensor segments coupled together to form a second portion of the linear array and having a second length,*

*such that the sum of the first length and the second length corresponds to a first maximum image size when sensed with the first resolution, and such that the second length corresponds to a second maximum image size when sensed with the second resolution.*

*22. A multiple resolution sensing apparatus as in claim 21, further comprising:*

*a plurality of third photosensor segments coupled together to form a third portion of the linear array and having a third length, wherein density of photosensitive elements within the third photosensor segment is greater than density of photosensitive elements in the second photosensor segments such that when scanning at a third resolution the third photosensor segments are used,*

*such that the sum of the first length, the second length, and the third length corresponds to a first maximum image size when sensed with the first resolution,*

*such that the second length plus the third length corresponds to a second maximum image size when sensed with the second resolution,*

*such that the third length corresponds to a third maximum image size when sensed with the third resolution, and*

*wherein when scanning at the first resolution the first photosensor segment and the second photosensor segment and the third photosensor segment are used, when scanning at the second resolution the second photosensor segment and the third photosensor segment are used, when scanning at the third resolution the third photosensor segment is used.*

*23. A multiple resolution sensing apparatus as in claim 22, wherein the first resolution, the second resolution, and the third resolution are manually selectable.*

*24. A multiple resolution sensing apparatus as in claim 22, wherein the first resolution, the second resolution, and the third resolution are automatically selected based upon an original image.*

*25. A multiple resolution sensing apparatus as in claim 22, wherein density of photosensitive elements within the second photosensor segment is greater than density of photosensitive elements in the first photosensor segment by a factor of four so that the second resolution is twice the first resolution.*

*26. A multiple resolution sensing apparatus as in claim 25, wherein density of photosensitive elements within the third photosensor segment is greater than density of photosensitive elements in the second photosensor segment by a factor of four so that the third resolution is twice the second resolution and four times the first resolution.*

*27. A multiple resolution sensing apparatus as in claim 4, wherein the peripheral regions are a first peripheral region and a second peripheral region such that the central region is disposed between the first peripheral region and the sec-*

*ond peripheral region, and such that the first photosensor segment is in the first peripheral region, and further comprising a third photosensor segment in the second peripheral region.*

*28. A multiple resolution sensing apparatus as in claim 27, wherein density of the third photosensor segment equals density of the first photosensor segment.*

*29. A multiple resolution sensing apparatus as in claim 27, wherein density of the third photosensor segment is greater than density of the second photosensor segment.*

*30. A multiple resolution sensing apparatus as in claim 27, further comprising a middle section disposed within the central section, the middle section having a fourth photosensor segment wherein density of the fourth photosensor segment is greater than density of the second photosensor segment.*

*31. A multiple resolution sensing apparatus as in claim 5, wherein the compensation means substantially equalizes the electrical signal of the higher resolution segments with the electrical signal of the lower resolution segments by summing and doubling the signals from the smaller sized photosensitive elements to yield a signal substantially equivalent to the signal produced by the larger sized photosensitive elements.*

*32. A multiple resolution sensing apparatus as in claim 5, wherein the compensation means substantially equalizes the electrical signal of the higher resolution segments with the electrical signal of the lower resolution segments by additional amplification of the signals from the smaller sized photosensitive elements to yield a signal substantially equivalent to the signal produced by the larger sized photosensitive elements.*

*33. A multiple resolution sensing apparatus as in claim 5, wherein the compensation means substantially equalizes the electrical signal of the higher resolution segments with the electrical signal of the lower resolution segments by increasing the light integration time of the signals from the smaller sized photosensitive elements to yield a signal substantially equivalent to the signal produced by the larger sized photosensitive elements.*

*34. A multiple resolution sensing apparatus as in claim 5, wherein the compensation means substantially equalizes the electrical signal of the higher resolution segments with the electrical signal of the lower resolution segments by increasing the illumination level which generate the signals from the larger sized photosensitive elements to yield a signal substantially equivalent to the signal produced by the smaller sized photosensitive elements.*

*35. A method as in claim 15, wherein a duplicate segment of the first photosensor segment is disposed such that the duplicate segment and the first photosensor segment are in the peripheral regions.*

*36. A method as in claim 35, wherein a third photosensor segment is disposed within the central region such that the third photosensor segment enables the following substep:*

*(a.3) scanning a third portion of the original image using the third photosensor segment, wherein density of photosensitive elements within the third photosensor segment is greater than density of photosensitive elements within the second photosensor segment, such that the third portion of the original image is scanned with a third resolution.*

*37. A method as in claim 16, wherein the step of substantially equalizing the electrical signal of the higher resolution segments with the electrical signal of the lower resolution segments is implemented by summing and doubling the signals from the smaller sized photosensitive elements to yield a signal substantially equivalent to the signal produced by the larger sized photosensitive elements.*

*38. A method as in claim 16, wherein the step of substantially equalizing the electrical signal of the higher resolution segments with the electrical signal of the lower resolution segments is implemented by additional amplification of the signals from the smaller sized photosensitive elements to yield a signal substantially equivalent to the signal produced by the larger sized photosensitive elements.*

*39. A method as in claim 16, wherein the step of substantially equalizing the electrical signal of the higher resolution segments with the electrical signal of the lower resolution segments is implemented by increasing the light integration time of the signals from the smaller sized photosensitive elements to yield a signal substantially equivalent to the signal produced by the larger sized photosensitive elements.*

*40. A method as in claim 16, wherein the step of substantially equalizing the electrical signal of the higher resolution segments with the electrical signal of the lower resolution segments is implemented by increasing the illumination level which generates the signals from the larger sized photosensitive elements to yield a signal substantially equivalent to the signal produced by the smaller sized photosensitive elements.*

*41. A multiple resolution sensing apparatus, comprising:*

*at least one first photosensor segment having a plurality of first photosensitive elements for scanning at a first resolution;*

*at least one second photosensor segment having a plurality of rows, each one of the plurality of rows having a plurality of second photosensitive elements for scanning at a second resolution, the at least one second photosensor segment adjacent to the at least one first photosensor segment, wherein the plurality of second photosensitive elements has a higher density than the plurality of first photosensitive elements so that an image is scanned at a higher resolution with the plurality of second photosensitive elements than with the plurality of first photosensitive elements; and*

*at least one third photosensor segment having a plurality of third photosensitive elements for scanning at a third resolution, the at least one third photosensor segment adjacent to the at least one second photosensor segment, wherein the plurality of third photosensitive elements has a higher density than the plurality of second photosensitive elements so that the image is scanned at the higher resolution with the plurality of third photosensitive elements than with the plurality of second photosensitive element.*

*42. An apparatus as in claim 41, wherein each of the plurality of second photosensitive elements are substantially a second size and wherein each element of the plurality of third photosensitive elements is substantially a third size, the second size being larger than the third size.*

*43. An apparatus as in claim 41, further comprising a means for scanning an image so that the image is first scanned across the at least one first photosensor segment, and then scanned across the at least one second photosensor segment, and then scanned across the at least one third photosensor segment in succession along a scanning path.*

*44. An apparatus as in claim 43, further comprising a memory so that data corresponding to the image scanned by the at least one first photosensor segment is stored in a first portion of the memory, wherein data corresponding to the image scanned by the at least one second photosensor segment is stored in a second portion of the memory, and wherein data corresponding to the image scanned by the at*

*least one third photosensor segment is stored in a third portion of the memory.*

*45. An apparatus as in claim 43, further comprising a memory so that a user selects between one of the first photosensor segment, the second photosensor segment and the third photosensor segment such that data corresponding to the image scanned by the selected photosensor segment is stored in the memory.*

*46. A multiple resolution sensing apparatus, comprising:*

*at least one first photosensor segment having photosensitive elements for scanning at a first resolution;*

*at least one second photosensor segment having a plurality of rows, each one of the plurality of rows having photosensitive elements for scanning at a second resolution, the at least one second photosensor segment adjacent to the at least one first photosensor segment; and;*

*at least one third photosensor segment having photosensitive elements for scanning at a third resolution, the at least one third photosensor segment adjacent to the at least one second photosensor segment,*

*wherein the photosensitive elements of the second photosensor segment have a higher density than the photosensitive elements of the first photosensor segment so that an image is scanned at a higher resolution with the photosensitive elements of the second photosensor segment than with the photosensitive elements of the first photosensor segment;*

*wherein, in creating a color image of the first resolution, the photosensitive elements of the first photosensor segment are used;*

*wherein, in creating a color image of the second resolution, the photosensitive elements of the second photosensor segment are used; and*

*wherein the photosensitive elements of the third photosensor segment have a higher density than the photosensitive elements of the second photosensor segment so that the image is scanned at the higher resolution with the photosensitive elements of the third photosensor segment than with the photosensitive elements of the second photosensor segment.*

*47. The apparatus of claim 46, wherein, in creating the color image of the first resolution, the photosensitive elements of the second photosensor segment also are used.*

*48. An apparatus as in claim 46, wherein each of the photosensitive elements of the first photosensor segment are substantially a first size and wherein each of the photosensitive elements of the second photosensor segment are substantially a second size, the first size being larger than the second size.*

*49. An apparatus as in claim 48, further comprising a memory so that data corresponding to the image scanned by the at least one first photosensor segment is stored in a first portion of the memory and wherein data corresponding to the image scanned by the at least one second photosensor segment is stored in a second portion of the memory.*

*50. An apparatus as in claim 48, further comprising a memory so that a user selects between the at least one first photosensor segment and the at least one second photosensor segment such that data corresponding to the image scanned by the selected photosensor segment is stored in the memory.*

*51. An apparatus as in claim 46, wherein an image is concurrently scanned across the at least one first photosensor segment and the at least one second photosensor segment along a scanning path such that a pixel area of the apparatus is increased to provide improved image quality.*

*52. An apparatus as in claim 46, wherein each of the photosensitive elements of the second photosensor segment is substantially a second size and wherein each of the photosensitive elements of the third photosensor segment is substantially a third size, the second size being larger than the third size.*

*53. An apparatus as in claim 52, further comprising a memory so that data corresponding to the image scanned by the at least one first photosensor segment is stored in a first portion of the memory, wherein data corresponding to the image scanned by the at least one second photosensor segment is stored in a second portion of the memory, and wherein data corresponding to the image scanned by the at least one third photosensor segment is stored in a third portion of the memory.*

*54. An apparatus as in claim 52, further comprising a memory so that a user selects between one of the first photosensor segment, the second photosensor segment and the third photosensor segment such that data corresponding to the image scanned by the selected photosensor segment is stored in the memory.*

* * * * *